(12) United States Patent
Thomson

(10) Patent No.: US 11,170,532 B1
(45) Date of Patent: Nov. 9, 2021

(54) METHOD AND APPARATUS, AND ANALYSIS FOR COLOR SPACE DETERMINATION OF SURFACE CONDITION

(71) Applicant: Paul E. Thomson, Cincinnati, OH (US)

(72) Inventor: Paul E. Thomson, Cincinnati, OH (US)

(73) Assignee: Ectoscan Systems, LLC, Cincinnati, OH (US)

(*) Notice: Subject to any disclaimer, the term of this patent is extended or adjusted under 35 U.S.C. 154(b) by 70 days.

(21) Appl. No.: 16/678,368

(22) Filed: Nov. 8, 2019

Related U.S. Application Data

(60) Provisional application No. 62/758,132, filed on Nov. 9, 2018.

(51) Int. Cl.
*G06K 9/00* (2006.01)
*G06T 7/90* (2017.01)
*G06T 11/20* (2006.01)

(52) U.S. Cl.
CPC .............. *G06T 7/90* (2017.01); *G06T 11/206* (2013.01); *G06T 2200/24* (2013.01)

(58) Field of Classification Search
CPC ...... G06T 7/90; G06T 11/206; G06T 2200/24
USPC ......................................................... 382/162
See application file for complete search history.

(56) References Cited

U.S. PATENT DOCUMENTS

| | | | |
|---|---|---|---|
| 2011/0090343 A1* | 4/2011 | Alt .................. | G06T 19/006 348/164 |
| 2016/0069743 A1* | 3/2016 | McQuilkin ........... | G01J 3/0205 356/416 |

* cited by examiner

*Primary Examiner* — Stephen P Coleman
(74) *Attorney, Agent, or Firm* — Mark F. Smith; Smith Brandenburg Ltd

(57) ABSTRACT

A system and method of determining the condition of a surface by scanning the surface of an object and detecting and measuring the electromagnetic spectrum being directed from the surface to obtain raw data from a plurality of points along the surface and assigning values for each particular data type of raw data and creating a color space for viewing by an operator to determine the condition of the surface.

17 Claims, 13 Drawing Sheets

*PRIOR ART*

Rotation of 2D Cartesian Systems Around the Value Axis

Fuzzy Graph

METHOD AND APPARATUS, AND ANALYSIS FOR COLOR SPACE DETERMINATION OF SURFACE CONDITION

The present application claims benefit to and incorporates in its entirety by reference the subject matter contained in U.S. provisional patent application No. 62/758,132 filed on Nov. 9, 2018.

BACKGROUND OF THE INVENTION

Artists, scientists, engineers, and individuals in many fields have struggled for centuries to define and to classify what "color" means and to construct widely acceptable systems to standardize color. Color Logic defines "color" as "the visual effect that is caused by the spectral composition of the light emitted, transmitted, or reflected by objects." Isaac Newton was one of the early pioneers of color research and is credited with devising what was likely the first color wheel. Since his time, artists, dye manufacturers, pigment chemists, physiologists, and workers in numerous other fields have devised a number of schema to define and classify color. Often these schema, while useful and applicable to a particular field, are relatively useless in other endeavors.

Complicating these efforts is the fact that "color", no matter how it is defined or classified, is a highly subjective sensory phenomenon. For example, "color context" is the study of how color behaves and is perceived relative to other colors and shapes. A "red" spot tends to appear more brilliant against a black background and somewhat duller against a white background. When contrasted with an orange background, a "red" spot tends to appear lifeless, whereas against a blue-green background the same "red" spot seems brilliant. A "red" square will appear larger against a black background than when laid upon other background colors. Thus, the "color" of a spot, region, or an area has a relativity based on the shape of the relevant area or object, any nearby or background colors adjacent to the object, and a host of intra- and inter-observer differences that can be attributed to such issues as color sensitivity or color blindness, personal experience, or even one's cultural upbringing.

These problems related to color are not merely academic issues. In many fields, accurate and reproducible color detection and color measurement can be extremely important. For instance, in medicine, the physical examination of the body surface often includes an assessment of "redness", as the presence of redness is one of the cardinal signs of inflammation and its presence (or absence) can thus lead the clinician to important clues about the condition of the patient's tissues. Further, the perceived magnitude of the "redness" can be vital in determining both the tissue diagnosis and eventual prognosis. Similarly, the surface assessment of color is important in a number of other fields, such as metal inspection for corrosion, agricultural inspections for ripeness or rotting, optical sensors for robotics, assessment of artwork or collectibles, and so on. One skilled in the art can see that the surface assessment of color is important in these fields and in myriad other areas.

As alluded to above, a number of color definition and classification schemas have been devised. One of the most commonly used systems classifies the color of a point or an area via three numerical values, each of which corresponds to the colors red, green, and blue. Hence this system, the "Red, Green, Blue" system, or "RGB" system, defines the color of a particular point as having a red number, a green number, and a blue number. A "red" spot might have the RGB code (255,0,0), while a "blue" spot would be (0,0,255) and a "green" spot might read out as (0,128,0). Under the "hexadecimal" color code system, the same three colors would correspond to the hex codes #FF0000, #0000FF, and #008000 respectively. Many other color code systems exist, each representing an attempt by its makers to identify and standardize the various colors.

While each of these systems has utility in various fields, such as standardizing the mixing of paint or the dyeing of fabrics, they do not accurately convey meaning when it comes to interpreting an object's surface condition. For example, what exactly does (255,0,0) mean to a physician who is trying to determine the precise condition of the skin surface? Certainly, the human eye does not see numbers when looking at a color. Or, what does it mean to the bridge inspector when he looks at a section of a girder to determine its condition and one spot is (183,65,14) whereas the adjacent spot is (204,85,0)? And what if these different spots are intermingled or interspersed with each other, each perhaps occupying a given total area of the relevant surface?

Systems have been developed in an attempt to obtain meaning from such color issues can be to use a more detailed system, one that encompasses a somewhat more intricate understanding of color, such as the "Hue, Saturation, Value", or the "HSV" system. In this system, all colors can be broken down into two broad categories, namely "achromatic" and "chromatic". The achromatic colors are white, gray, and black, whereas the chromatic colors, or "hues", correspond to the colors of the rainbow (red, orange, yellow, green, blue, indigo, and violet, or "ROYGBIV") and their various hue mixtures, such as "cyan", a mixture of blue and green. Thus the "hue" of a color corresponds to the chromatic depiction of the colors as one might see in the traditional ROYGBIV rainbow. Color has at least two other attributes, however. The "value" of a particular hue can be thought of as the "lightness" or "darkness" of the hue; this corresponds to the hue's luminosity and is closely related to the hue's ability to reflect light back to the observer. A pure hue, mixed with say, white, becomes lighter and is said to have been "tinted". Thus, a pure red hue, mixed with white, becomes a "pinkish" hue and this hue is then said to have a higher "value" than the original red hue. Likewise, a pure red hue, when mixed with black, becomes a darker red. We say that the original red hue has been "shaded" and this dark red has a lower "value" than the original red hue. The "saturation" of the hue is perceived as the intensity, clarity, vividness, or purity of the hue. A "fully saturated" hue is essentially one in which there is no admixture of other hues. On a physical basis, "hue" corresponds to the dominant wavelength of the perceived light from the object or area, "value" corresponds to the total light reflectivity of the perceived hue, and "saturation" corresponds to the wavelength bandwidth from the object or area. Simplistically, value can be thought of as the mixing of a pure hue with an achromatic color, such as the grayscale colors of white, gray, or black, while saturation can be thought of as the purity or the impurity of a hue due to the presence of other wavelengths hidden with the otherwise "pure" hue. The achromatic colors of white, gray, and black can have lightness or value but no hue or saturation. Thus, "white" reflects all the light (i.e., all the wavelengths) of light back to the observer, whereas "black" does not reflect any light (i.e., none of the wavelengths) back to the observer. The achromatic colors cannot have any hue because they have no dominant wavelength, as all wavelengths are equally present within these colors.

The HSV system has been graphically depicted in several forms, such as a wheel and axle, a cone, and even a double pyramid. On the "wheel and axle" image (FIG. 1), the vertical "axle" represents value, from black at the bottom to white at the top. The "wheel" represents the hues, encircling the axle and running circularly around as ROYGBIV and the various secondary colors, such as cyan and magenta. The "wheel" is attached to the "axle" by "spokes", representing the saturation of the hue. It will be known to one skilled in the art that a variety of numerical systems have been applied to various points along the axle, the wheel, and the spokes. For example, the Munsell color system assigns values from 0 (corresponding to black at the bottom of the axle) to 10 (equivalent to the white at the top of the axle). This system assigns values for saturation from 0 (where the spoke meets the axle) up to values in the 30s depending on the exact hue. Hues can be measured in degrees around the wheel (in the Munsell system this measurement is broken down into a more complex integer form). One skilled in the art will note that other scales have been used in this and other color systems.

FIG. 2 represents the HSV system as a hexagon derived by transformation of the RGB system cube (wherein red, green, and blue form the three dimensions of the cube) into a flattened hexagon. Here, hue is again represented by the angle of the vector from the origin, while saturation is the proportion of the distance of a given point on the hue vector from the origin in the center to the edge of the hexagon. In this projection, value is not graphically depicted. To most easily maintain the graphical depiction of value in this model, one ideally returns to the RGB cube, as tilted on its black vertex, wherein value can be graphically depicted as the vertical height of a given point within the tilted cube relative to a plane projected below the cube (see FIG. 3). Again, it should be clear to one skilled in the art that many graphical and spatial representations for the various color systems have been developed and these figures are given for illustrative purposes only.

Most digital imaging devices, such as digital cameras, scanners, and the like, "detect" color via the use of color filters placed in front of the sensor elements, usually charge-coupled devices (CCDs) or complementary metal oxide semiconductors (CMOSs). These filters allow only certain parts of the full color spectrum to reach each of the sensors (which in themselves can generally detect only grayscale images). Usually, in a color camera, these filters selectively filter and then transmit either red, green, or blue visible light onto the sensor, which then records the color as red, green, or blue. Computer processing is subsequently used to process the image, combining the RGB colors back together to achieve the original color scene. A similar process is used when viewing the images on a computer monitor, as the various color pixels are used to combine the RGB data back into the original image. Thus, in both obtaining an image and later in displaying the image, data are derived in a RGB format and displayed in an RGB format. Hence, digital color data are in RGB form, and any worker wishing to measure the actual color of a point or an area on the surface of an object is given the "amount" of red, green, or blue at the point or area of interest in RGB scale numbers, from 0 to 255 for each of the three colors. As mentioned previously, this is not at all intuitive to the human brain and steps must be taken to derive the actual meaning of the color data as they pertain to the condition of the object's surface.

SUMMARY OF THE INVENTION

The present invention comprises methods, apparatus, and various analytical and mathematical models to link the color numbers to actual "ground truth" surface meaning and surface condition.

In a preferred embodiment of the invention includes using other color code systems, such as HSV, to convert RGB values into something a little closer to meaningfulness, and using additional steps to render raw color numbers, regardless of the color system chosen, into a form that can yield definitive and/or probabilistic determinations as to the object's surface condition.

A preferred embodiment of the invention is a method of determining the condition of a surface comprises the steps of scanning the surface of an object and detecting and measuring the electromagnetic spectrum being directed from the surface to obtain raw data from a plurality of points along the surface and assigning values for each particular data type of raw data; creating a Cartesian coordinate system wherein each coordinate axis represents a particular data type; plotting the assigned values of the raw data on the Cartesian coordinate system for each plurality of points to create a first color space; and displaying the first color space for viewing by an operator to determine the condition of the surface.

In a preferred embodiment of the invention the method further comprises the step of displaying a second color space for the surface of the object and determine differences between the first color space and the second color space.

In a preferred embodiment of the invention, the method further comprises the steps of the operator selecting a particular point on the first color space having certain values for each particular data type; and displaying an image of the surface showing particular points on the image of the surface having the same values for each particular data type.

In a preferred embodiment of the invention the raw data includes measurements of color.

In a preferred embodiment of the invention the raw data includes measurements of color and gloss.

Another preferred embodiment of the invention the method of determining the condition of a surface comprises the steps of: scanning the surface of an object and detecting and measuring electromagnetic spectrum being directed from the surface to obtain raw data from a plurality of points along the surface and assigning values for each particular data type of raw data; creating a coordinate system having one coordinate axis representing a particular wavelength and one coordinate representing a value of each wavelength; plotting the values of the raw data for each plurality of points on the coordinate system to create a first color space; and displaying the first color space for viewing by an operator to determine the condition of the surface.

In a preferred embodiment of the invention the coordinate system is a radial coordinate system.

In a preferred embodiment of the invention the method includes displaying a second color space for the surface of the object and determine differences between the first color space and the second color space.

In a preferred embodiment the method includes the steps of an operator selecting a particular point on the first color space having certain values for each particular data type; and displaying an image of the surface showing particular points on the image of the surface having the same values for each particular data type.

The subject invention further is a system of determining the condition of a surface comprising sensors that operate to scan the surface of an object and detecting and measuring electromagnetic spectrum being directed from the surface and to obtain raw data from a plurality of points along the surface; an analysis module that received raw data from the sensors and operates to assign values for each particular data type of raw data; wherein the analysis module further operates to create a coordinate system having one coordinate axis representing a particular wavelength and one coordinate representing a value of each wavelength; wherein the analysis module further operates to plot the values of the raw data for each said plurality of points on the coordinate system to create a first color space; and a display device that receives data from the analysis module and operates to display the first color space for viewing by an operator to determine the condition of the surface.

In a preferred embodiment of the invention the coordinate system is a radial coordinate system.

In a preferred embodiment of the invention the analysis module further operates to display a second color space for the surface of the object and operates to determine differences between the first color space and the second color space.

In a preferred embodiment of the invention the analysis module further operates to receive information from the operator of a selected particular point on the first color space having certain values for each particular data type; and Wherein the display device operates to display an image of the surface showing particular points on the image of the surface having the same values for each particular data type.

In a preferred embodiment of the invention the raw data includes measurements of color.

In a preferred embodiment of the invention the raw data includes measurements of color and gloss.

Various other objects, advantages, and embodiments of the invention will be apparent from the following description, the accompanying drawings, and the appended claims.

DESCRIPTION OF THE INVENTION

Figure 8:
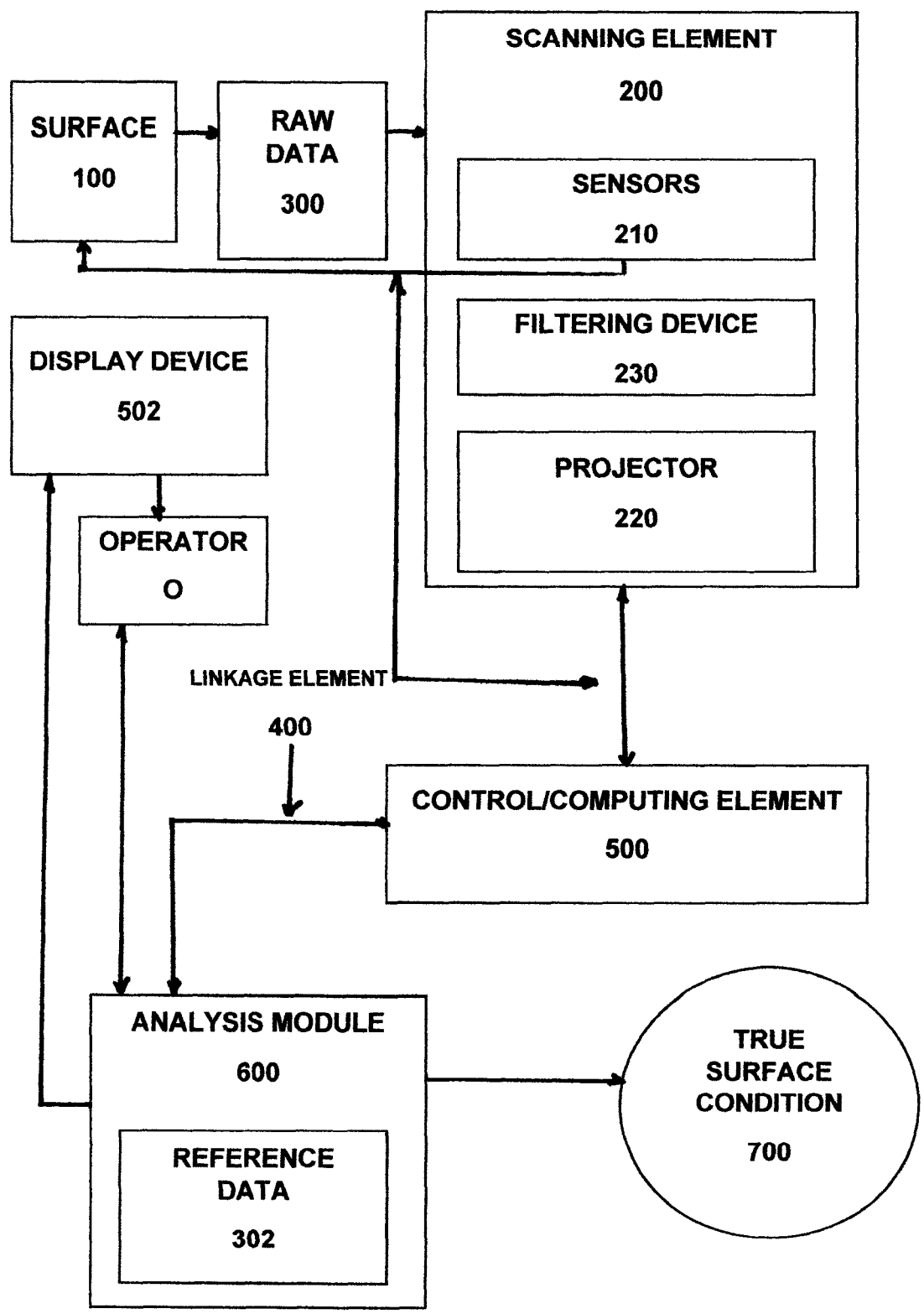
FIG. 8: Illustrates a generalized schematic of the invention.
Figure 14:
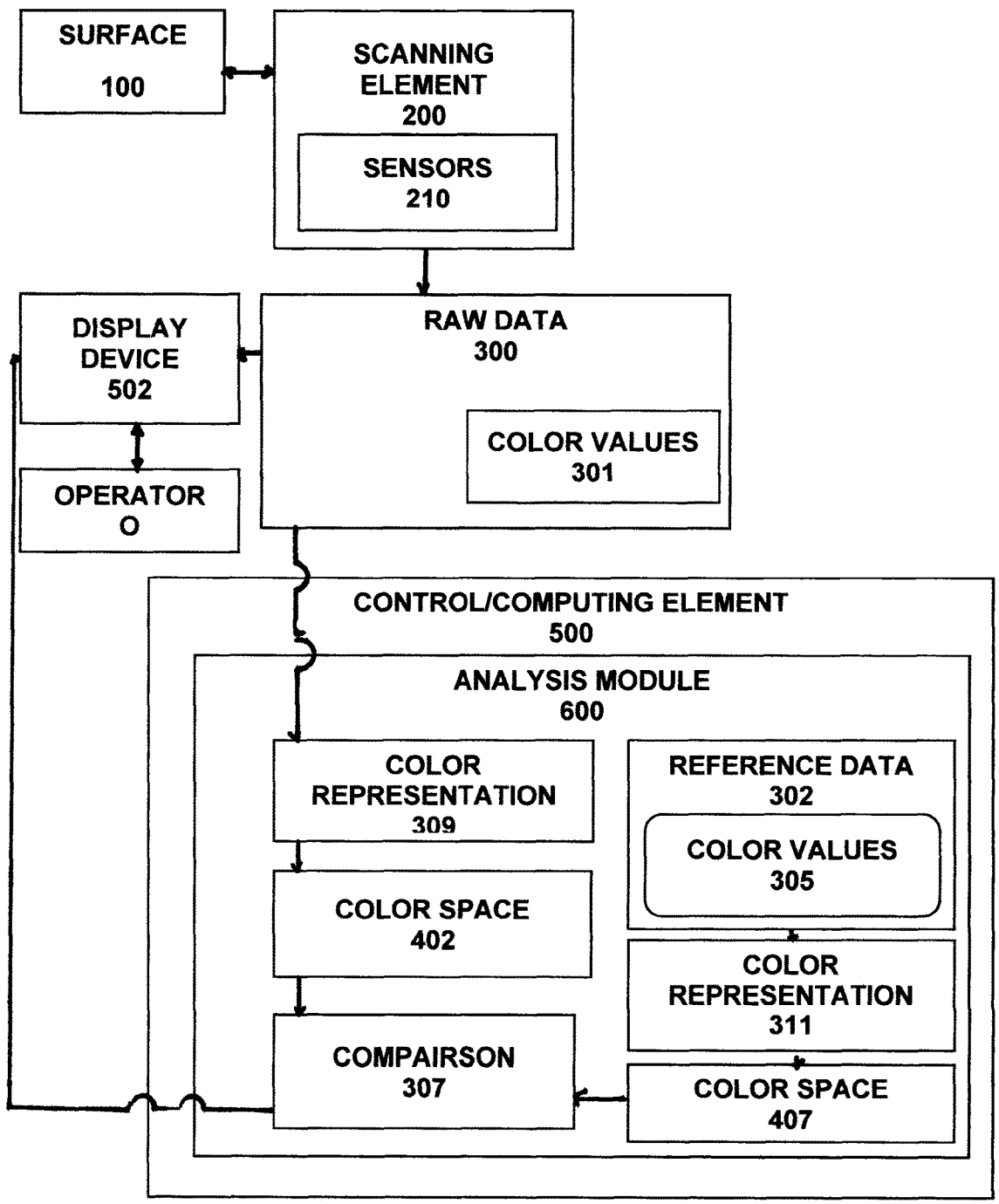
FIG. 14 Illustrates another generalized schematic of the invention.

FIGS. 8 and 14 schematically depict the basic elements of the invention. A surface (100) is scanned by a scanning or photographing element (200) having the ability to detect and measure color (both achromatic or greyscale and/or chromatic colors). It should be noted that surface 100 could comprise either a real physical surface or it could comprise a virtual surface as might be generated by any electronic or photographic or scanning device or as might be generated by a computer simulation or by another computer program. Scanning element 200 may also comprise the ability to detect and measure "gloss" or reflectivity as well as any other part of the electromagnetic spectrum, such as infrared, ultraviolet, x-ray or other high energy photons or lower energy photons such as radio waves. Scanning element 200 thus comprises sensors (210) able to generate raw data (300) for any or all of the foregoing colors, gloss, or other parts of the electromagnetic spectrum. These raw data 300 are then are then communicated via a linkage element (400) to a control/computing element (500). This linkage element 400 may comprise electrical wires, cables, fiber optic cables or any of the standard and accepted means of transmitting electronic, photonic, or digital data. Similarly, control/computing element 500 may comprise any of the known and standard computing devices, such as smartphones, electronic notepads, electronic notebooks, laptop computers, desktop computers, and the like. Control/computing element 500 comprises an analysis module (600) (or is in communication with a separate analysis module) that operates to take in the raw data 300 and subjects these data to analysis to yield a surface "truth" or surface condition (700). Control/computing element 500 also comprises all of the usual and customary computer devices, such as a keyboard, display screen, etc.

Scanning or photographing element 200 may comprise a projector or projectors (220) to project light (either visible light or again, electromagnetic wavelengths from the non-visible parts of the electromagnetic spectrum, [with all such parts of these visible and these non-visible parts of the electromagnetic spectrum hereinafter referred to simply as "light"]) onto the surface 100. This projector 220 can project the light directly or perpendicularly at the surface 100 or the light can be projected at some other angle to the surface, such as an acute angle. Alternatively, the projected light can be shined at the back of the surface 100, and would thus be transmitted through the surface, as in the situation wherein the surface 100 existed on the outside of a relatively thin or a relatively clear or transparent object. Such projected light, or simply ambient or non-projected light either reflected passively off of the surface 100 or can be transmitted through the surface 100 from an environmental source, may also be detected and measured by sensors 210. Projector 220 can use filtering devices 230 such as filters, grids, screens, or other devices having the ability to selectively transmit or conversely to block certain wavelengths of light. For example, filtering device 230 can comprise a standard color filter, a color wheel, a diffraction grating, and the like. In one preferred embodiment, filtering device 230 comprises a white-coated, baffle-containing integrating sphere into which or onto which the incident light is projected. This can be done to minimize the contribution of gloss or reflectivity to the perceived color (as, for example, increased gloss on a surface tends to make a hue seem darker, or more shaded or more saturated). Similarly, surface 100 can be bathed in ambient or other environmental light that has been screened or altered to transmit or to block certain wavelengths of light from impinging on or being transmitted through the surface 100. Projector 220 can comprise any of the known and accepted types of light sources, such as incandescent bulb projectors, fluorescent light projectors, light-emitting diode projectors, infrared light projectors, and the like.

Sensor or sensors 210 can comprise any of the extant and commercially available color or light detecting devices, such as color film or color digital cameras, photosensors, CCDs, CMOSs, machine vision cameras, glossmeters, thermal detectors, ultraviolet detectors, and the like.

Sensors 210, after detecting and measuring the light and features from surface 100, then produce, via standard and extant means from such devices, raw data 300. Such raw data 300 may comprise a variety of outputs, such as RGB data (either in RBG format or another color format, such as HSV), grayscale or achromatic data, or gloss or reflectivity data. If desired, such raw data 300 can actually comprise false color, either hardware derived (as via filtering devices 230 which might, for example, comprise green blocking filters to enhance red hues) or derived via software manipulation of the raw data (such as hue-to-hue conversion of, say, green to blue or red to green). Raw data 300 can also comprise pseudocolor, such as assignment of chromatic colors to greyscale or the like. Control/computing element 500 can comprise various modules that operate to apply density slicing to the raw data 300, such as is occasionally done with pseudocolor, or control/computing element 500 can comprise other modules that operate to remove sources of metameric failures or to remove color confounders, such as diminution of color saturation near the color area of interest, thus reducing the problem of saturation contrast. It should be now be clear to one skilled in the art that raw data 300 can comprise just one form of color data, or it could comprise any combination or all of the various forms of color data together as mentioned above.

Figure 4:
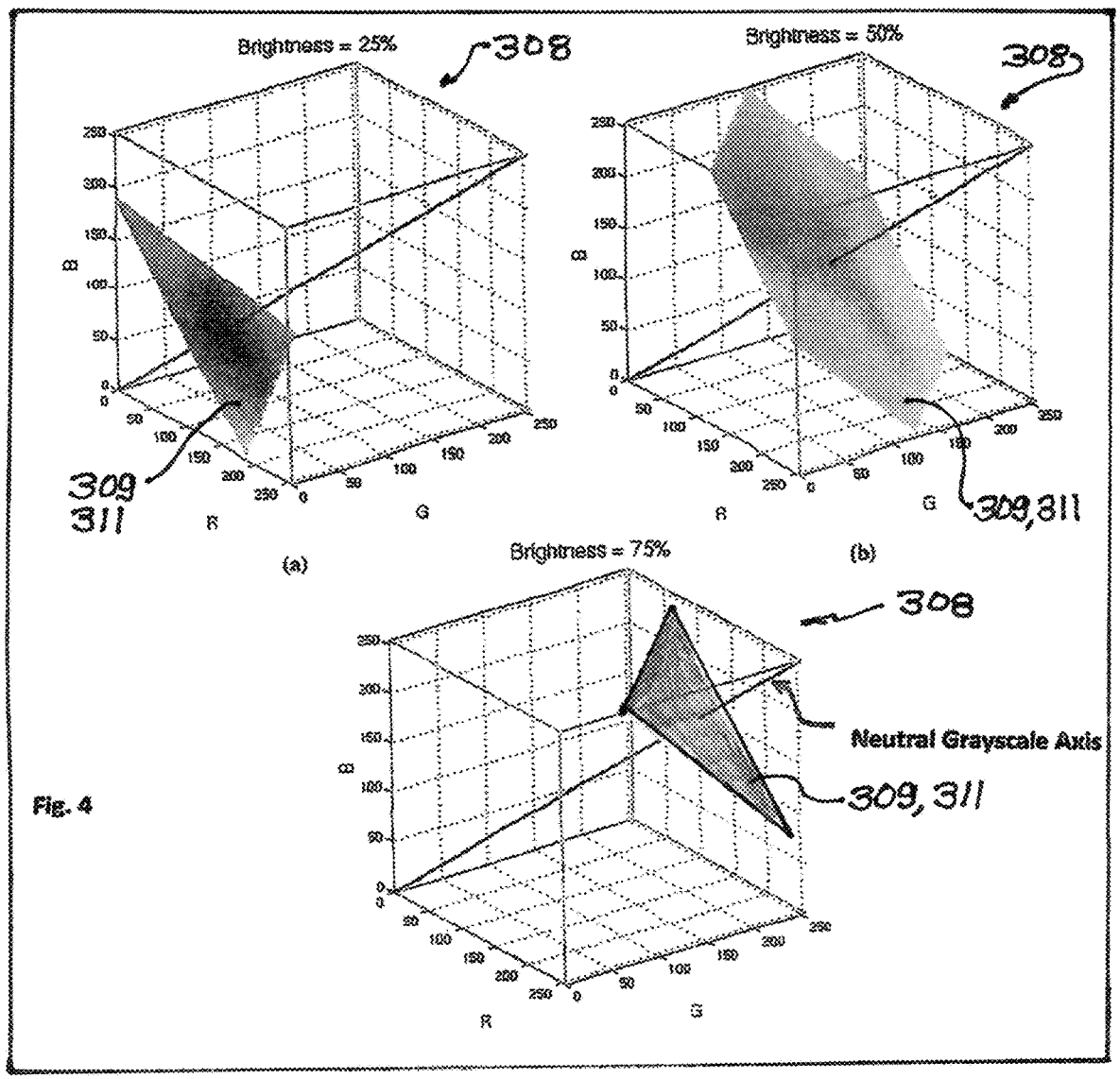
FIG. 4: Illustrates a prior art RGB cube, showing a color representation that colors of the same brightness (here, colors at brightness values of 25%, 50%, and 75%, for example) in the form of a plane section of the cube, wherein this plane is perpendicular to the neutral grayscale axis.
Figure 5:
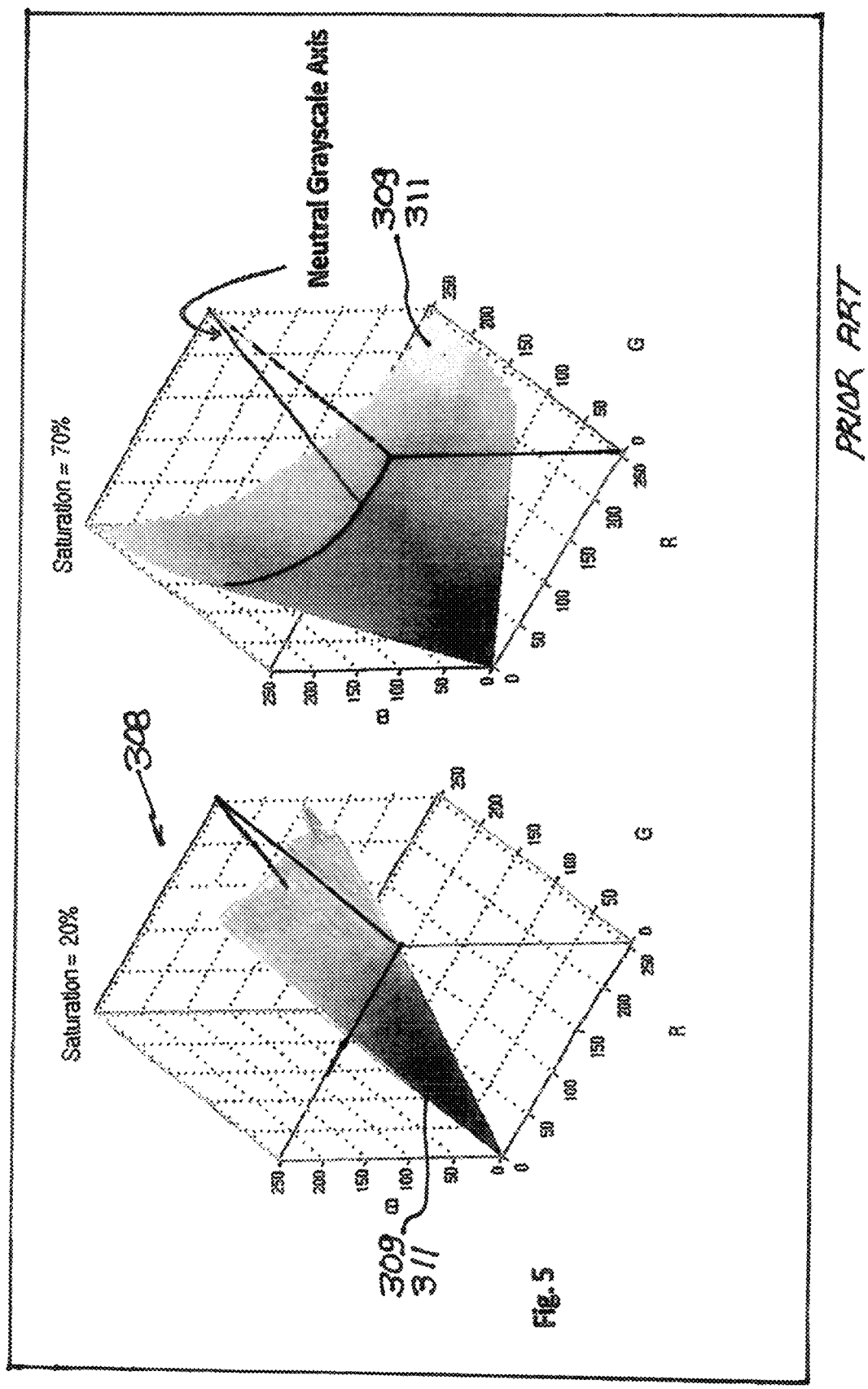
FIG. 5: illustrates a prior art RGB cube, showing that colors of equal saturation (here, colors at saturations of 20% and 70%, for example) form a cone around the grayscale axis, since saturation in this projection is proportional to the perpendicular radial distance from the neutral grayscale axis.
Figure 6:
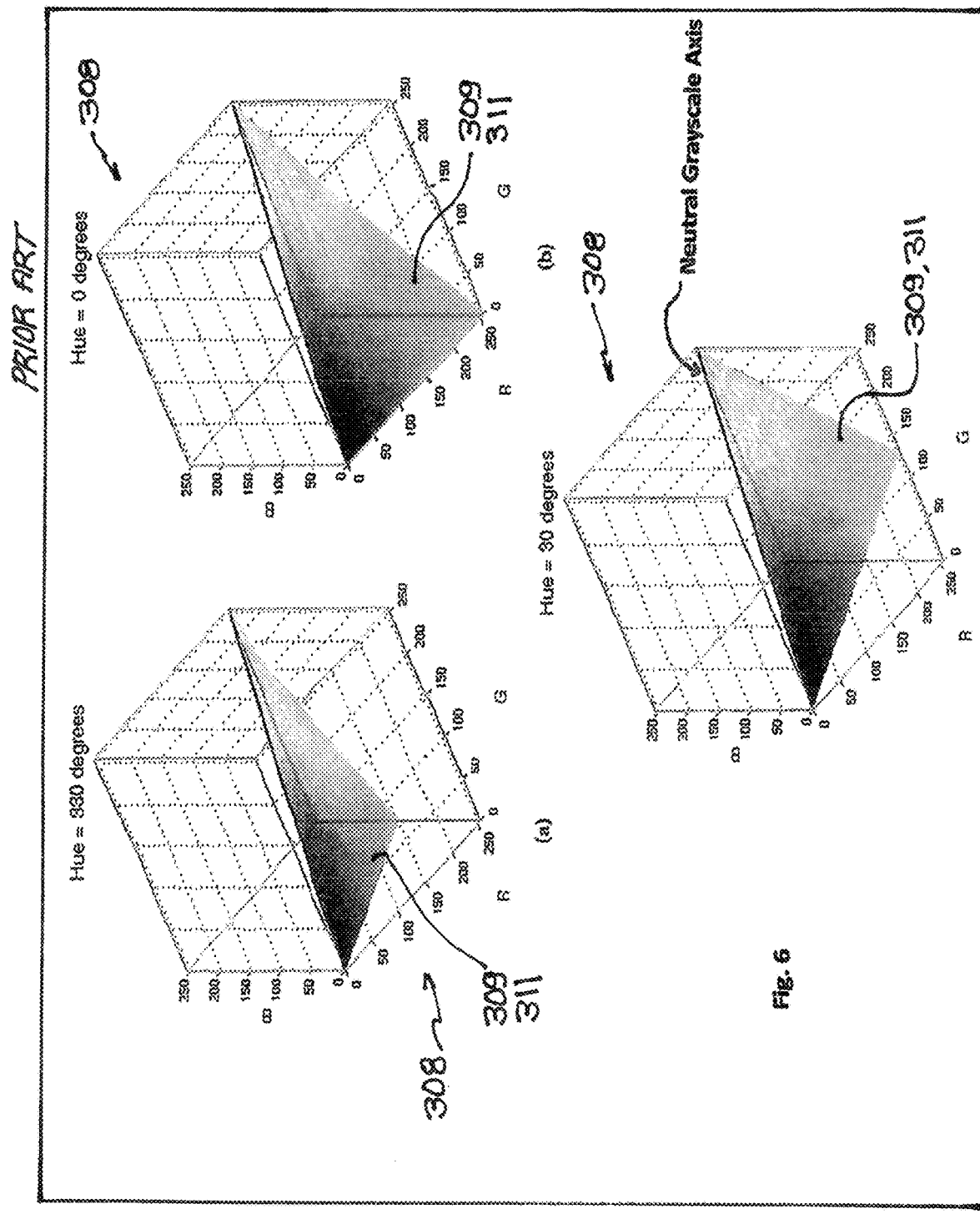
FIG. 6: Illustrates a prior art RGB cube, showing that planes of constant hue are represented in this projection by a triangular plane with its three vertices being the two grayscale axis termini and any point on the cube's surface.

As illustrated in FIGS. 8 and 14, after receiving the raw data 300 from the sensors 210 via the linkage elements 400, control/computing element 500 then operates with the analysis module 600 to analyze this raw data. In a preferred embodiment the analysis module 600 operates to provide straight delivery of the raw data 300 to an operator O, thus allowing the operator (via a standard computer display device 502) to simply view the color numbers or values 301 (such as but not limiting example, RBG values or HSV values) contained within the raw data. In another preferred embodiment, analysis module 600 operates to compare the raw data 300 to reference data 302 having color numbers or values 305 derived from previously scanned and stored data or as inputted by a human operator. For example, in this preferred embodiment the analysis module 600 operates to make a comparison 307 of the raw data 300 to reference data 302 such as a color, or a value, or a brightness, or a clarity or saturation, or a gloss, or some combination of these data types, as picked visually, such as using a color palette or a color wheel, by the human operator. In another preferred embodiment, analysis module 600 operates to make a comparison 307 of raw data 300 to reference data 302 such as a machine-derived or to a software derived comparator number, as, for instance, by comparison 307 of the raw data 300 to reference data 302 such as a pre-programmed known standard, such as, in the case of a white skin surface, the "Caucasian color palette". In another preferred embodiment, the analysis module 600 operates to make a comparison 307 of the raw data 300 to reference data 302 such as by using coordinate spaces or color spaces 402, 407. In a preferred embodiment, a comparison 307 of raw data 300 to reference data 302 is performed by first assigning raw data 300 in the form of points to a specific area, or to a three-dimensional space or volume, such as in the form of a color volume cube, such as shown in FIG. 5, to create a color representation 309. Reference data 302 in the form of points are assigned to a specific area, or to a three-dimensional space of volume, such as shown in FIG. 5, to create a color representation 311. In another preferred embodiment (FIG. 9), the raw data 300 are assigned by analysis module 600 to spatial coordinates derived by creating a first color coordinate system 308, such as a x-y or Cartesian coordinate system wherein the x-axis 310 comprises the wavelengths of the measured color or colors from the relevant surface region (surface area scanned 100) and the y-axis 312 comprises the amount of each wavelength present in the relevant scanned surface 100. Thus, the raw data 300 from the scanned surface 100 and reference data 302 are plotted on the coordinate system 308 to create a color representation 309, 311 of the surface 100, such as shown in FIGS. 4, 5 and 6. As shown, the color representation 309, 311 can be depicted in the form of a curve or distribution, with the peak of the curve representing the dominant hue or wavelength and the "width" or spread of the curve in essence representing the saturation of the dominant hue or wavelength. (Hence, the "wider" or flatter the curve the less the saturation of the dominant hue.) Various mathematical operations can be performed on the graphical data, for example, one can "normalize" the y values in some fashion, such as assigning the total y-axis to values running from zero to 100. This "normalization" can also be performed on the x-axis or on any additional axes.

Figure 12:
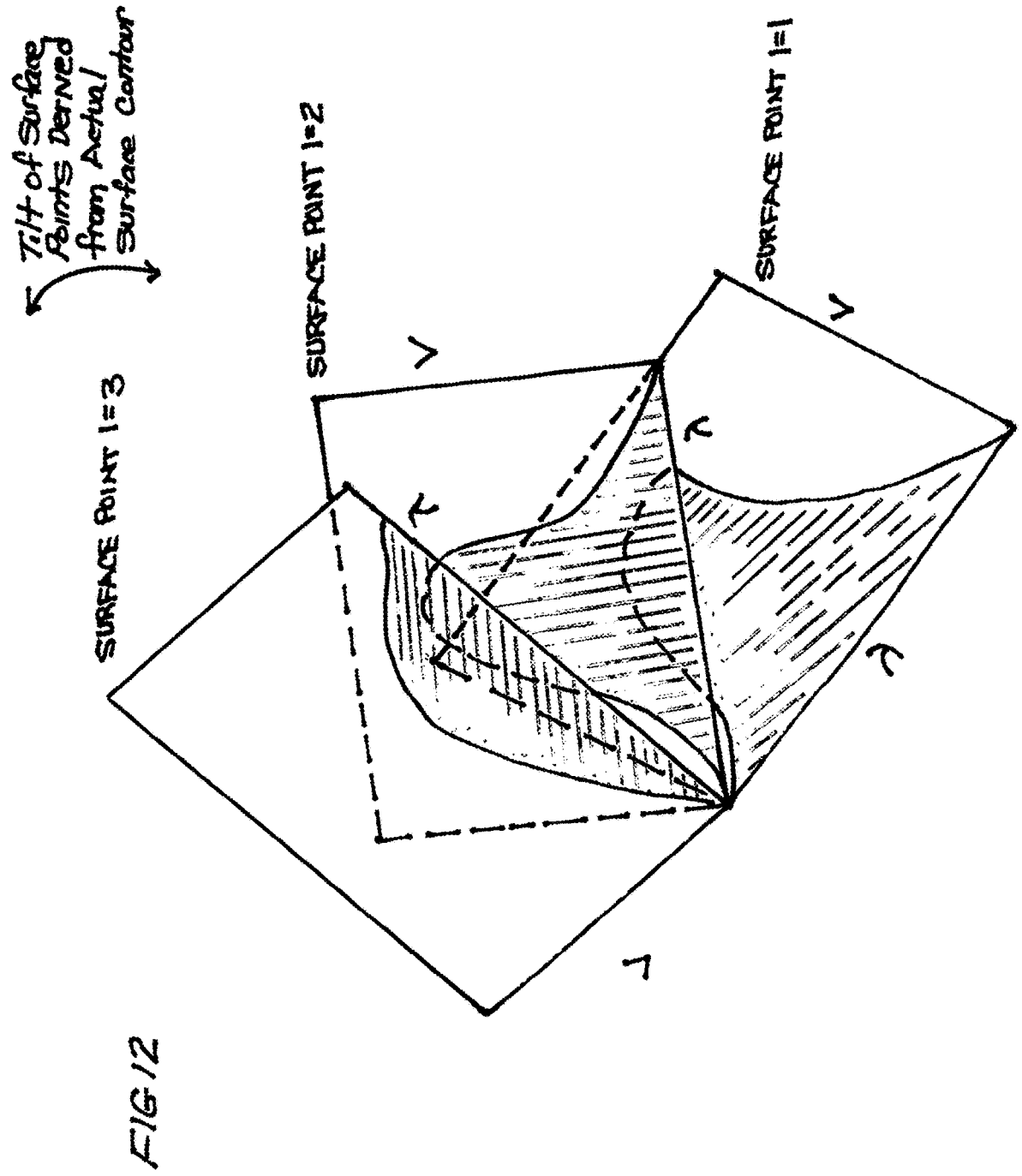
FIG. 12: Illustrates the Cartesian coordinate systems of FIG. 9, forming a coordinate space comprising a series of graphs tilted according to the actual surface contour of the scanned surface 100. Geometric addition of the various 2D Cartesian systems can comprise a set of points, lines, curves, areas, or spaces thus comprising the data of the actual surface points.

If additional raw data (and it should be noted that these additional data can be further data from the same point or area on the relevant surface or these data can be derived from other points or areas) are used in the analysis conducted by the analysis module, then additional 2-D Cartesian systems or graphs can be constructed. By selecting a set of color values 301, 305 and stacking these 2-D Cartesian areas upon each other, as in a deck of playing cards, creates a coordinate space or color space 402, 407 (FIGS. 7, 10 and 12) in the form of an undulating 3-D surface set of points, comprising a line, and/or an area or surface (created by outlines of the curves from each Cartesian space) and/or a 3-D volume (created by the areas under the various curves as the Cartesian systems are stacked up). Alternatively, these 2-D Cartesian graphs can be spun around the one of the axes, say the y-axis, to create a radial coordinate system and coordinate space (see FIG. 10). In one preferred embodiment, the additional third dimension thusly created represents different actual spatial points or areas upon the true physical or virtual scanned surface 100. In another preferred embodiment, this third dimension can comprise another raw data parameter, such as color value (which can include greyscale, or gloss). It should now be apparent to one skilled in the art that the x and the y axes, or any third or z-axis or radius created, can each comprise or could each represent any of the numbers of raw data 300, or they each could represent or depict any point within the various known color wheels, color systems, or color volumes. It should also now be apparent to one skilled in the art that the coordinate space or color space 402 can use various coordinate systems and does not need to be restricted to only two or to three dimensions. Adding additional raw data points or adding data pertaining to different color parameters or adding data from different points or from different areas on the actual scanned surface 100 can create a coordinate space or color space in the form of a hyperarea, or a hyperspace, or a hypervolume comprising four or more dimensions. When these coordinate or graphical operations are performed across different points or areas on the actual scanned surface 100, then the color or HSV or gloss variance or the variance of the combination of these data across the many points comprising the surface 100 can be derived as the slope of the curves or the change in the areas or volumes under the curves in the 2-D or the 3-D spaces.

Figure 1:
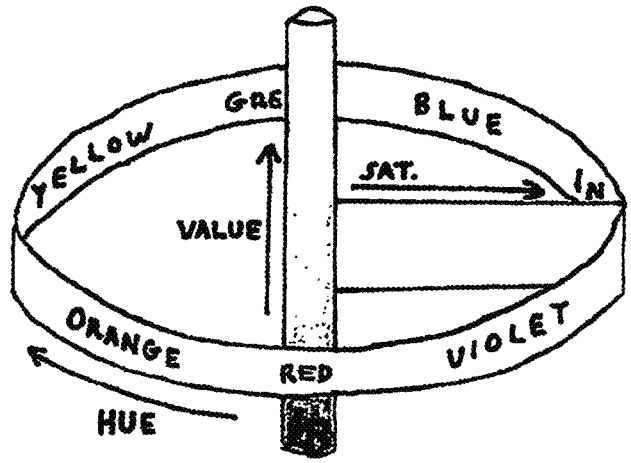
FIG. 1: Shows a prior art standard color wheel, wherein hues wrap around the circumference of the wheel, value forms the axis of the wheel, and saturation forms the radius or the spokes of the wheel.
Figure 2:
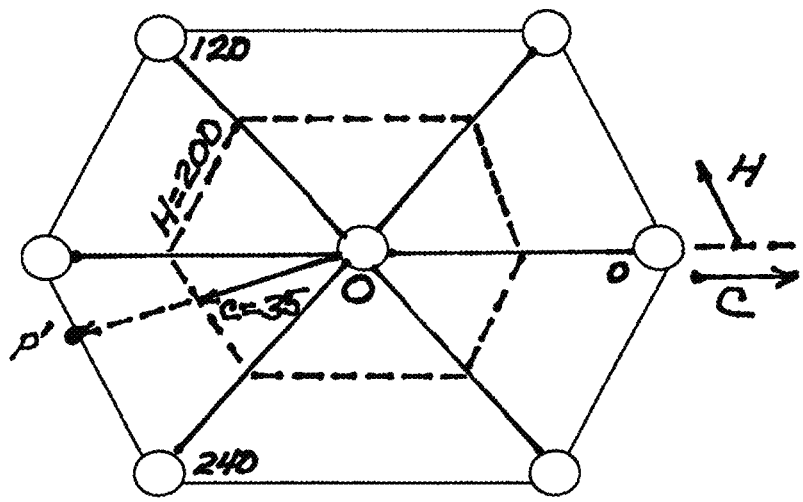
FIG. 2: Shows a prior art hexagonal representation of the RGB cube, derived by "flattening" the RBG cube along its grayscale axis.
Figure 3:
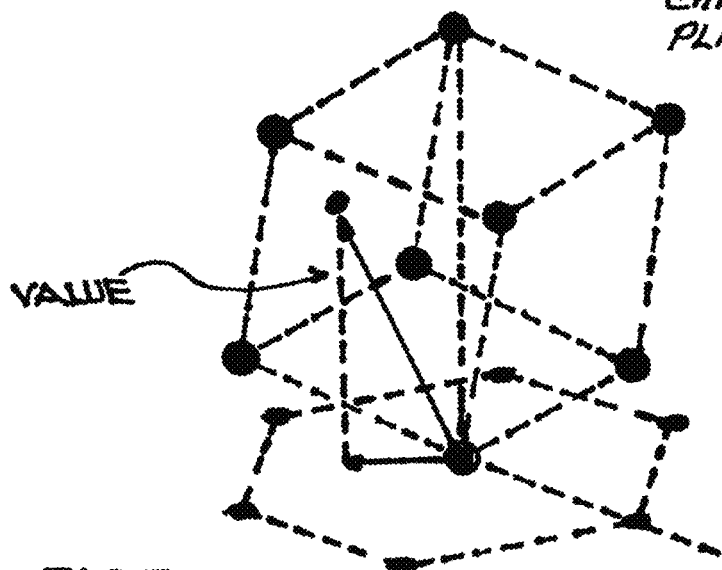
FIG. 3: Shows the prior art RGB cube projected above the flattened hexagon of FIG. 2, showing that value can be graphically depicted in such a projection.
Figure 7:
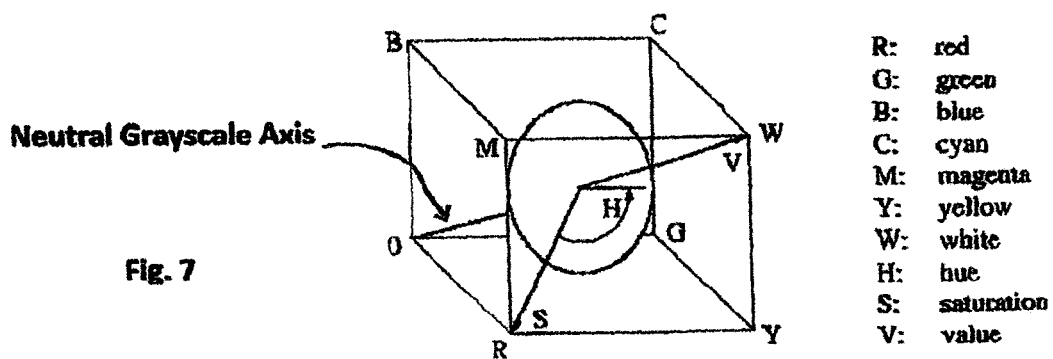
FIG. 7: is a graphical "summary" of the relationship between the RGB cube and HSV creating a coordinate space.

As illustrated in FIG. 4, an RGB cube 308 is in an ordinary projection, and HSV is defined relative to this cube in this view. Here, the colors are of the same brightness are depicted as those whose three components (R, G, B) sum to the same total value. Any particular level of brightness is graphically depicted as a plane perpendicular to a neutral grayscale axis running from the (R, G, B) point (0,0,0) to its opposite corner, wherein the point (0,0,0) would be achromatic black and the opposite point (255,255,255) would be achromatic white. In essence, this grayscale axis is the same as the axle in FIG. 1. "Brightness", here, is defined as (R+G+B)/3. This quantity does not correspond to directly to value, which is equal to the maximum value of either the R, G, or B values. Further, "brightness", while a physical property of color, is not most closely matched to human color perception. One way to look at the brightness is via "luminance" (Y), which equals $0.3R+0.59G+0.11B$, and which most closely matches the sensitivity of the human eye (which actually has three different color receptors, each primarily sensitive to one of the three primary colors, R, G, or B. About $2/3$ of the photoreceptors in the human eye are primarily sensitive to the longer wavelengths of visible light (namely the ROYG part of the rainbow). The saturation of any point, in this model, is proportional to the perpendicular distance from the point to the neutral grayscale axis. Thus, the closer a point is to the grayscale axis the less saturation it has. Surfaces of equal saturation therefore form a cone with its vertex at (R, G, B)=(0,0,0) and with the cone centered around the grayscale axis (see FIG. 5). Hue, in this RGB cube 308, is then defined as the angular position (from 0° to 360°) around the grayscale axis (again, this is in analogy to the "wheel" as depicted in FIG. 1). Hence, the triangle formed by any point on the cube's surface and the two grayscale axis termini (that is, RGB=0,0,0 and RGB=255,255,255) is a plane of constant hue (see FIG. 6). FIG. 7 graphically summarizes the relationship between the RGB cube and the HSV space. Again, one skilled in the art can now appreciate that FIG. 7 essentially depicts the "wheel and axle" of FIG. 1, wherein the "axle" of FIG. 1 is tilted such that its termini become the RBG (0,0,0) and the (255,255,255) vertices on the cube and in which the "wheel" of FIG. 1 spins around this axis inside of the RGB cube.

Figure 9:
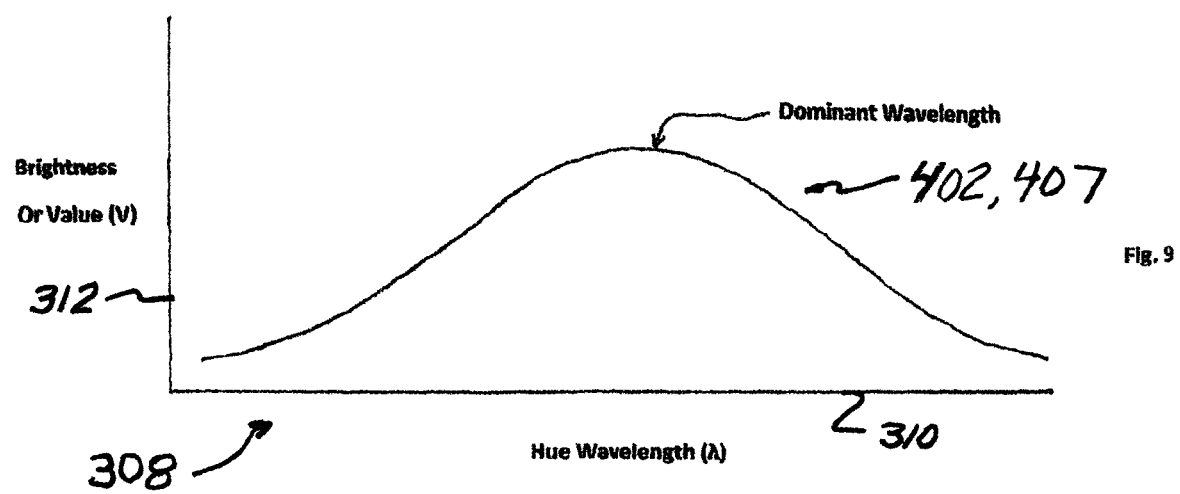
FIG. 9: Illustrates a Cartesian coordinate system in the form of a Cartesian coordinate system in which the abscissa comprises the hue wavelengths from a given point, area, or space, and in which the ordinate comprises the brightness or value of each wavelength. Note that the color saturation at this point, area, or space may be comprised by the "width" or the deviation of the curve.
Figure 10:
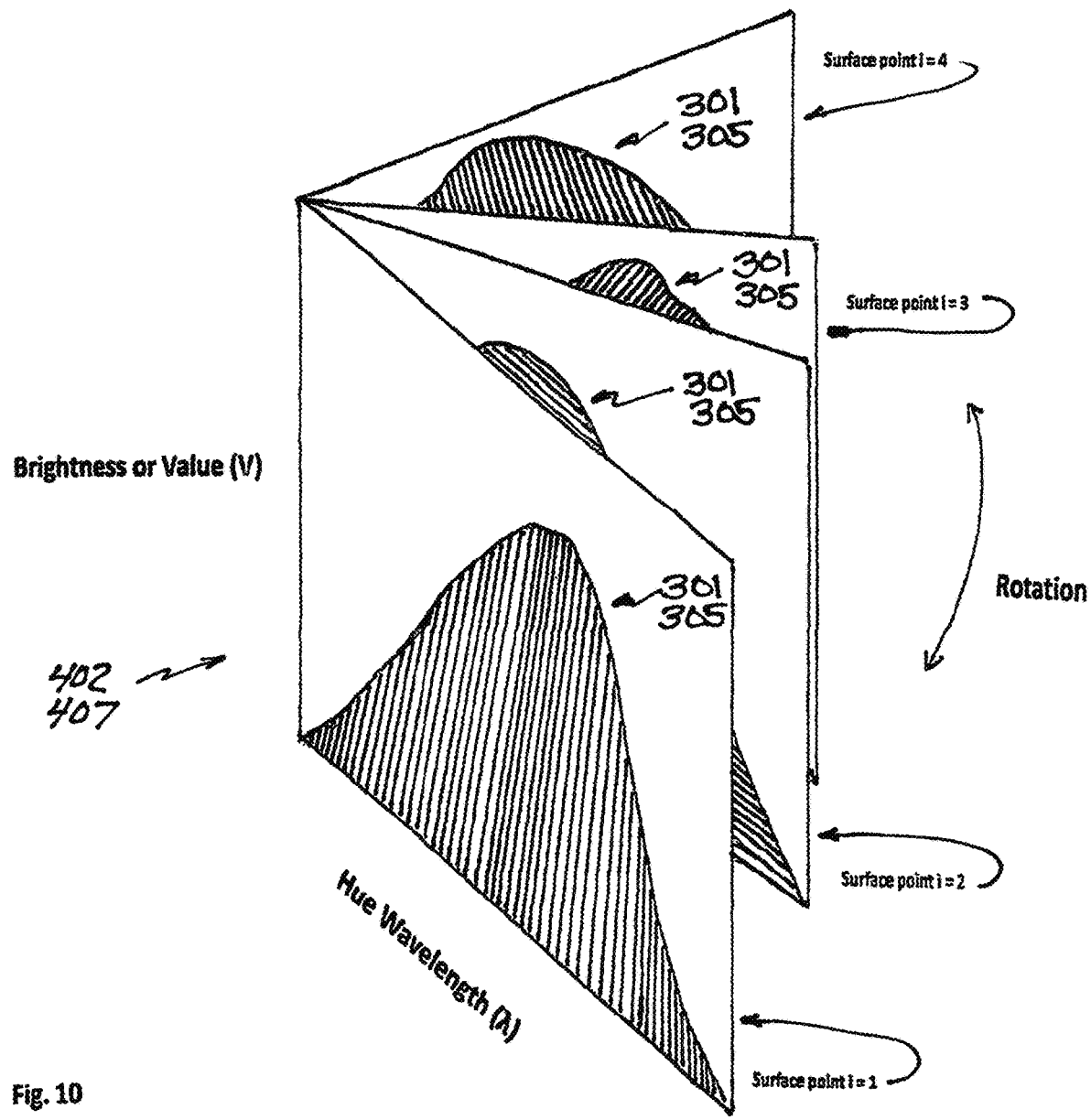
FIG. 10: Illustrates the Cartesian coordinate systems of FIG. 9, depicted as spinning radially around the vertically held ordinate of brightness or value. Geometric addition of the various 2D Cartesian systems can comprise a set of points, lines, curves, areas, or spaces thus comprising the data of the actual surface points.
Figure 11:
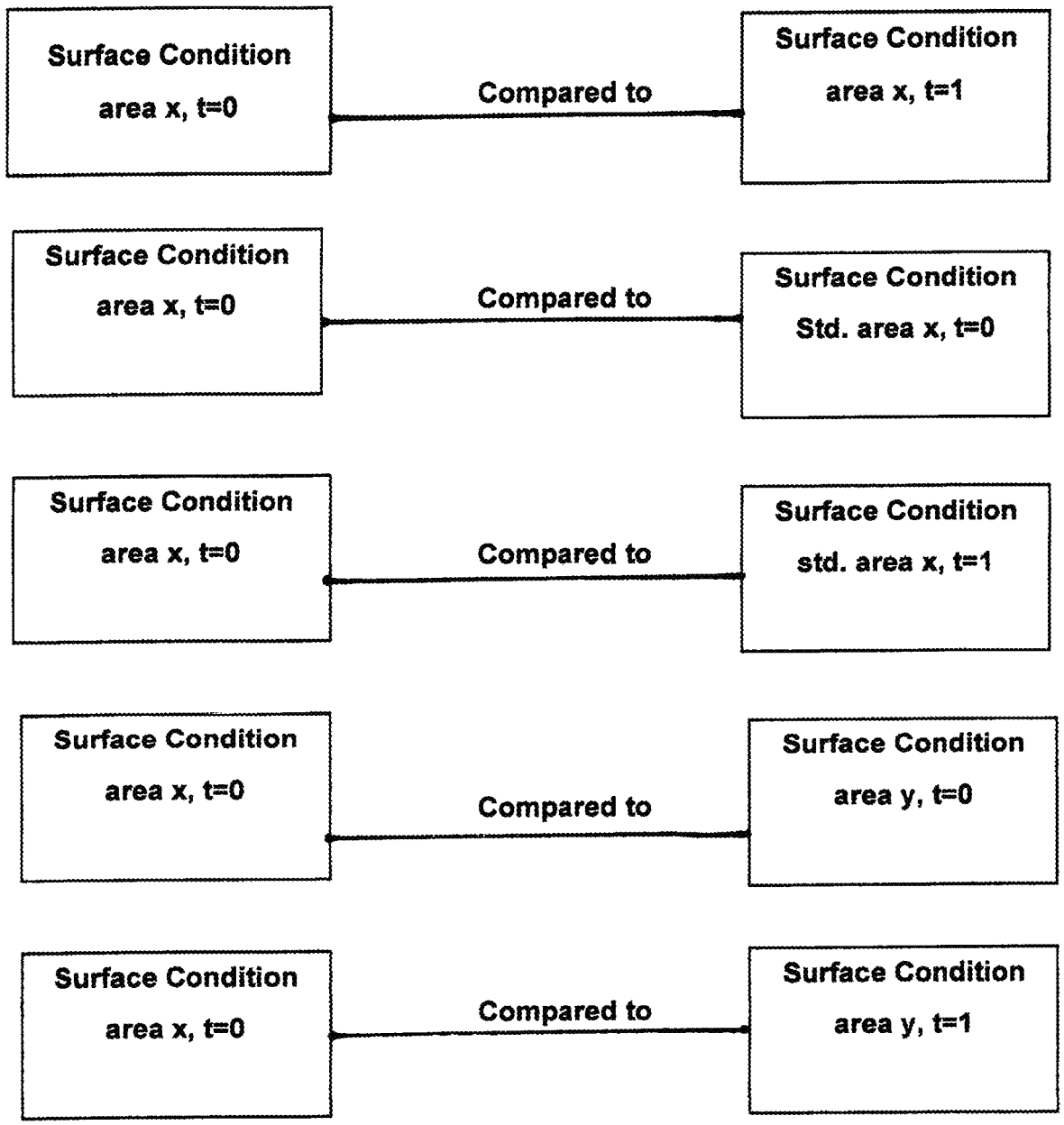
FIG. 11: Is a schematic depiction of some of the comparisons that can be created by the analysis module 600.

Once the analysis module 600 converts the raw data 300 into a spatial point or points or into a color representation 308 via one or more of the methods above, then analysis module 600 operates to link these spatial values to the surface "truth" or the or surface condition 700 by creating a coordinate space or a color space 402, such as shown in FIGS. 7, 9 and 10). In one preferred embodiment, analysis module 600 operates using the color curves and spaces derived previously and these 2-D or 3-D coordinate values are then booted up and displayed on a display device 502 so that they can be compared visually by the operator O by the control/computing element 500 depicting these older color spaces (or curves) overlaid over the new color spaces (or curves) such that the operator O can subjectively determine the relative overlap of the older and newer color spaces (or curves). Here, the greater the coincidence of the older and the newer color spaces (or curves), the greater the new surface condition approximates the condition of the previously scanned surface. In another preferred embodiment, the raw data 300 are converted by the analysis module as above to color spaces such as 3-D points, curves, surfaces, or volumes and then using a conventional registry algorithm the analysis module operates to compare the degree of overlap of the color spaces formed with the new raw data 300 to color spaces formed with older reference data 302, such as from a previously scanned surface. Again, the greater the degree of overlap, the more closely the new surface condition approximates the previously scanned surface condition. It should now be apparent to one skilled in the art that any of the known methods for comparing color spaces, such as point, line, curve, surface or volume comparisons can be used to attempt to match one set of previously derived points, lines, curves, surfaces or volumes to a newer set of similar geometric figures. It should also now be readily apparent that the surface color variance between two color spaces or as determined by comparing and interpreting data values from different points or areas on the actual scanned surface (as mentioned above) could also be compared, either by known geometric methods (in the case of simple lines, for example) or by the 3-D methods above, as by a conventional registry system. FIG. 11 schematically depicts some various operations of that can be performed by the analysis module 600.

The analysis module 600 can utilize various generic formulae and their more specific formulaic derivatives. In general, one skilled in the art should now recognize that the "true" surface condition (TSC) of surface 100 is proportional to the "perceived" surface condition (PSC) as might be delivered by the human eye or as might be delivered via various machine-derived data, such as raw data 300. Thus, $$TSC = k(PSC)$$

where k is a constant (or constants) of proportionality. It should be noted that k may be any number of values, even changing values, or inverse values (especially in the case of the presence of confounders, such as might be true with gloss, metameric errors, or color context errors). It should also now be clear to one skilled in the art that the TSC might be desired to be the human eye derived or approximated surface condition, or TSC might be desired to be the machine depicted surface condition, or it may comprise some combination of these conditions. The desired TSC might even be a virtual or software-derived condition. In general, the TSC of a surface area s ($TSC_{area\ s}$) or, more simply, $TSC_s$ will be the sum of all the TSCs of all the points, parts, or pixels on the surface constituting or comprising the given surface s. Obviously, the PSC would also be the PSCs of all the points, parts, or pixels on the surface constituting or comprising the surface s as well, but for the sake of clarity, TSC will be discussed below. One skilled in the art will now recognize that TSC and PSC can be interchanged in the formulae that follow. Thus, $$TSC_s = k[\Sigma(\text{surface condition})_i]$$

Where k is a constant or constants (e.g., $k_1 \ldots k_N$, where N=some integer value ≥1), i equals one individual point or pixel, and n equals the total number or points or pixels comprising surface s. Since each point or pixel has its own color condition, contour condition, and thermal condition, one can write:

$$TSC_s = k_{color}[\Sigma(\text{color condition})_i] + k_{contour}[\Sigma(\text{contour condition})_i] + k_{thermal}[\Sigma(\text{thermal condition})_i]$$

where the ks represent constants of proportionality due to color, contour, and thermal conditions respectively. Now, looking specifically at color (but recognizing that similar or identical formulae or operations can be developed for contour and for thermal conditions), one can write the formula for the TSC as derived from or as derived via color ($TSC_{s,color}$ or, more simply $TSC_{s,c}$) as:

$$TSC_{s,c} = k_{color}[\Sigma(\text{color condition})_i].$$

Simplifying $k_{color}$ as $k_c$, and knowing that the color condition of the surface is represented in RGB or HSV numbers, one can write:

$$TSC_{s,c} = k_c[\Sigma(R,G,B)_i] \text{ or } TSC_{s,c} = k_c[\Sigma(H,S,V)_i]$$

These formulae are easily expanded using the various definitions of the RGB and the HSV numbers. For example, if color value is equated to color brightness, then one can write:

$$TSC_{s,c} = k_c\{\Sigma[H,S,(R+G+B)/3]_i\}.$$

Similarly, it is known that saturation is the relative colorfulness of a point, pixel, or area with respect to its brightness. In the RGB cubes of FIGS. 4 and 5 the colorfulness of any point is perpendicular to its distance from the neutral axis, as this axis is grayscale and has no hue. The farther a point is from this axis then, the more colorful it is. Thus, one can say that saturation equals this distance (d) from the neutral axis relative to the distance along the neutral axis (b), which is the brightness, or, as depicted in the RGB cube, Saturation (S)=colorfulness/brightness=distance from axis/distance along axis=d/b. The last equation is expanded further:

$$TSC_{s,c} = k_c\{\Sigma[(H,(d/b),(R+G+B)/3]_i\}.$$

Since hue (H) is represented as the arc distance (a) of the cone circle as seen in FIG. 5, one can further write:

$$TSC_{s,c} = k_c\{\Sigma[(a,(d/b),(R+G+B)/3]_i\}.$$

In another preferred embodiment, as depicted in FIG. 9, the color condition of each point, pixel, or area is graphically portrayed in a coordinate system 308, such as a Cartesian coordinate system creating a coordinate space or color space 402, wherein the x-axis 310 denotes different wavelengths of hue, the y-axis 312 denotes the value or brightness of the respective wavelengths or hues, and in which saturation is denoted by the relative spread of the wavelengths along the x-axis 310. Herein, the color condition of each point, pixel, or area i is comprised as this 2-D x-y color space (or curve(s)) contained therein. Here, hue (H) is a specific wavelength (λ) of light, value (V) is equal to the height of that wavelength (generally only the height of the dominant, or highest y number, wavelength would matter), and saturation (S) is chosen in a variety of ways. In one preferred embodiment, S is simply defined as the width of the wavelength curve at some defined y value, such as the width at the point where the dominant wavelength was at its half height (=½y of the dominant wavelength). In another preferred embodiment, S is defined as a deviation along the curve from some point along the curve, such as a standard deviation from the mean or some deviation from the dominant wavelength. In another preferred embodiment, S is denoted as a difference, such as:

$$S_i = [\lambda_{dominant\ hue} - \Sigma(\lambda_{non-dominant\ hues})]_i$$

In another preferred embodiment, S is the difference in the area of the curve under the dominant or selected wavelengths and the areas under the rest of the wavelengths. If the area under the curve was depicted as a histogram, then, in general, this difference can be written as:

$$S_i = [(\text{area of vertical bar under } \lambda_{dominant\ hue}) - \Sigma(\text{areas of vertical bars under } \lambda_{non-dominant\ hues})]_i$$

It would now be apparent to one skilled in the art that one could normalize the values along the x and or the y axes such that the x and/or the y values might only have values between certain limits, such as zero to 100. Here one might have equations of the form:

$$S_i = k[\lambda_{dominant\ hue} - \Sigma(\lambda_{non-dominant\ hues})]_i,$$

Where k, the constant of proportionality, would for example be equal to some normalized number or value along the x axis. It should now be apparent to one skilled in the art that S could comprise other quantities or graphical geometries as well as those above. Further, since the curve(s) contained within this x-y coordinate system may also comprise the color condition of the point, pixel, or area i, we can generally write that the $TSC_i$ might be comprised by this curve and/or the areas contained above or below this curve. This curve would have the general form:

$$y = f(x),$$

and, if we choose the lower limit of the wavelength as $\lambda_a$ and the upper limit of the wavelength as $\lambda_b$, then from the integral calculus we can derive the definite integral for the area under the curve as:

$$TSC_i = \text{Area}_{a,b} = \int f(x) dx$$

One skilled in the art can now see that similar formulae can be derived for intersections of curves on the x-y coordinate systems comprising multiple points, pixels, or areas on a surface. Likewise, analysis module 600 may utilize formulae for calculating line segments, curves, areas or surfaces, or volumes or the intersections of these geometric figures as well as the slopes of these geometric figures. It is now evident that families of curves of the above form create a collection of points that together define the aforementioned geometries. Slopes of the above geometries comprise the color change or the color variance from one point, pixel, or area on the surface to another point, pixel, or area on the surface. It is also now be apparent to one skilled in the art that other coordinate systems, such as polar coordinate systems, can be utilized by the analysis module 600. It should now also be clear to one skilled in the art that such geometric forms and points comprise a set of points existing above, in virtual space as it were, above the actual surface 100, creating a color space 402, and thus analysis module 600 in a preferred embodiment operates to create a virtual set of points with color conditions (and/or with contour conditions and/or thermal conditions) corresponding to actual points on the surface 100. This virtual set of points can comprise any set of geometries as mentioned above, and thus creating a color space such as an eigensurface or an eigenspace above the actual surface 100. Thus, analysis module 600 may in another preferred embodiment operate to create manipulations of these eigenvalues and this eigensurface and this eigenspace. In the embodiment, wherein the color space is comprised by a point, a set of points, and/or a geometrical figure, overlaps and comparisons can be made via known geometric mathematics, such as Euclidean or non-Euclidean geometry, or using a conventional registry algorithm.

The analysis module 600 can also operate to analyze other color issues, such as gloss or various confounding factors. For example, gloss might be due to some inherent property of the surface 100 (e.g., "flat" black versus "gloss" black), or it can comprise some other feature of the surface 100, such as surface contour. In the case wherein gloss (G) is a function of surface contour, we note that, in general, the greater the ability of the point, pixel, or area to reflect incident light back to the sensor 210, the greater its gloss. Thus, points, pixels, or areas whose surface contour is planar and perpendicular to the direction of the incident light will have greater gloss, whereas points, pixels, or areas who surface contour tends to reflect light (either projected or environmental or ambient light) away from the direction of sensor 210 will have lower gloss. Since each point, pixel, or area i will have its own gloss value, for the total surface of n points, pixels, or areas, one can write:

$$G_i = k_{gloss}[\Sigma(G)_i]$$

It should be noted that, in cases where the point, pixel, or area has a surface contour which is parallel to the direction of the incident light, the value of G decreases, whereas G tends to be higher for points, pixels, or areas that are perpendicular to the direction of the incident light. If A represents the angle between the incident light and the reflected light having a vertex at the point, pixel, or area i, and if I represents the inherent reflectivity of the material at the point, pixel, or area i, then maximum gloss occurs when A is at a minimum and when I is at a maximum. If I goes to zero, then G becomes a function of A alone, and one can write:

$$G_i = k_{gloss}[\Sigma f(A)_i]$$

Graphically, one can depict the relationship between G and A on an x-y Cartesian coordinate system wherein the x axis depicts A and the y axis depicts G as a line or a curve with negative slope. One skilled in the art knows that the relationship of gloss to RGB or HSV is complex. High gloss tends to make hues seem darker (more shaded) and/or more saturated. In the RGB color space (FIGS. 4 and 5), higher G tends therefore to make hues seem simultaneously farther down on the neutral axis and also perpendicularly farther away from this axis. Thus, for a given hue, higher G tends to maximize the ratio d/b. Thus, gloss can be incorporated into the formulae above.

There are many ways to incorporate gloss into the graphical and/or the geometrical sets of points that may be utilized by the analysis module 600. In one preferred embodiment, the x-y Cartesian system above, wherein the x-axis comprises hue wavelength and the y-axis comprises value or brightness, gloss could be comprised by a tilting of the entire x-y Cartesian space around a z-axis that projects through the x-y origin. In this embodiment, the addition of gloss creates a planar, propeller-like geometry wherein the gloss value "spins" the x-y graphs like propeller blades around this z point. Here, gloss values are represented as radial values that "spin" the x-y graphs to a particular radial orientation. In another preferred embodiment, gloss values comprise a true z-axis along which different points along the z-axis represent different gloss values. Here, the x-y graphs are distributed along the z-axis like beads on a string. In another preferred embodiment, the x-y graphs are "spun" vertically around the y axis to create a cylindrical space or a cylindrical volume, with the degree or radial spin of an individual x-y graph around the y-axis determined by the gloss value. In another preferred embodiment, the x-y graphs are "spun" vertically around the y-axis with the gloss value determining the radial position of the individual x-y graph (as above), but with these individual x-y spaces tilted based on some other parameter, such as contour. One form of this embodiment could comprise a space in which the tilt of the x-y space comprises the actual contour tilt of the surface 100. (See FIG. 12.) In another version, this tilt comprises a thermally-derived value. In another preferred embodiment, the entire RBG cube or the HSV space or HSV cone is moved in a 4-D hyperspace or hypervolume wherein gloss or some other parameter comprises the fourth dimension. One skilled in the art can now see that there are a variety of ways to geometrically combine gloss or other parameters with the rest of the color space. Any of these configurations, taken over and over across the surface by assessment of the different points on the surface or via comparison to other scans as depicted in FIG. 11, can comprise a set of points, line segments, curves, areas, surfaces, and/or volumes, as before, that can then be compared, again as above, by usual and known Euclidean and/or non-Euclidean mathematics or via a conventional registry system.

One skilled in the art can now appreciate that analysis module 600 may utilize these or other such methods that expand upon the above generic methods or geometries as might be modified by specific surface characteristics, confounders, or other such items as may be of interest or which may be of utility.

Once the degree of overlap or registry is determined via the methods discussed above, the meaning or actual surface condition of the relevant surface 100 can be verified by a variety of mathematical methods, such as Boolean logic, standard probability, or fuzzy logic. Thus, analysis module 600 may also operate to utilize one or more of these mathematical methods to provide the likelihood that the derived points, lines, curves, spaces, or volumes in the color space actually carry the true surface meaning or true surface condition indicated by the scan. For example, a physician may scan a patient's skin looking for the skin surface condition of a bedsore as indicated by the "redness" of the scanned tissue. He uses scanning element 200 to derive skin surface data 300 which are then transmitted to control/computer element 500 via linkage element 400. The physician takes multiple scans of different regions of the patient's sore, and he/she may even scan some healthy, uninvolved tissue to act as a color control. Or, he/she may have previous scans of the patient's bedsore from earlier visits. The scan data, derived from the scanner as RGB color data, are converted to another, more precise, color system, such as HSV or a CIE system (International Commission on Illumination), via standard and available color conversion tables.

Raw data, such as HSV data, the present invention allows a number of methods to convert these data to surface meaning 700. In one preferred embodiment, each raw HSV data point is directly compared to a standard and previously derived database of HSV values, each of which has been assigned a clinical meaning via clinical studies. Thus, a scanned point in the bedsore may yield a RGB value of 220,20,60 which converts to HSV values of 348°, 90.9%, 86.3% (roughly a crimson red), which from prior clinical studies, corresponds to a tissue surface condition of "fresh blood". While useful, this embodiment does not provide for assignment of the obtained raw data values to a color space. Hence, with no color space assignment, no 2-D or 3-D geometry is constructed, no registry can be performed, no ready spatial comparison (for example, with previous scans of the same point) can be visually or graphically made, and no functions such as registry or its subsequent probability determinations can be obtained. In another preferred embodiment, the HSV data are assigned to their respective locations in one of the coordinate spaces or color spaces above, and any number of operations can be performed by the analysis module 600. For instance, addition of HSV data from other points on the bedsore surface might yield a set of curves 602 as seen in FIG. 10. These curves, taken together as per the present invention, can yield a set of points that when connected yield a curve or a line segment, the orientation of which in space, as well as its slope, provide clinically relevant information on the surface of the tissue. In this instance, a steep slope from one scanned point on the surface to the next scanned point might would indicate a sudden change in the condition of the surface, such as a demarcation line across which the blood flow to the surface was cut off. Likewise, the vector orientation of the curve or the line segment in the color space carries important information, as the direction of the line segment or curve from one point to another on the surface would correspond to changes in say, color value or in gloss, while another color parameter, say saturation, was held essentially constant. An example of this might occur in the case of the dominant wavelength (that of crimson red blood) remaining constant across a set of surface points, but the color value decreasing, or shading, due to older or darker (less well oxygenated) blood in the surface point corresponding to one terminus of the curve or the line segment. If the third or higher dimension of the color space was devoted to gloss, similar inferences about the actual surface condition could be derived. For instance, if a region of the bedsore was healing, the new cells would tend to fill in the healing areas in little lumps, creating what physicians term "granulation tissue" because of its granular, or cobblestone-like, appearance. Such tissue would have poorer gloss, or reflectivity, than non-healing or "fibrotic" tissue, which is scar-like and smooth. Suppose gloss and color value were held constant across several points in the bedsore, but another color parameter, such as green, was changing. An area of high but constant gloss, such as a patch of scar or fibrotic tissue, might thus show one point with near achromatic white, indicating scar with little or no blood flow (i.e., old scar) whereas another region of the scar would have a more magenta color, indicating poorly oxygenated blood therein. One skilled in the art can now easily recognize that similar lines and curves could be generated from multiple scans of the same surface taken over different periods of time as well space, or from scans compared from different sources, such as one scan from a standard surface (either virtual or real) and the other scan from the surface of concern. Similarly, scans could yield a 3-D surface as well as a 3-D volume (color space). These 3-D geometries can themselves be compared, either as above or via registry, to derive clinically valid inferences about the surface condition. One skilled in the art can now see that the various parameters of the color scan, such as hue, value, saturation, greyscale, and gloss, can be obtained and interpreted separately or ideally can be obtained simultaneously.

Figure 13:
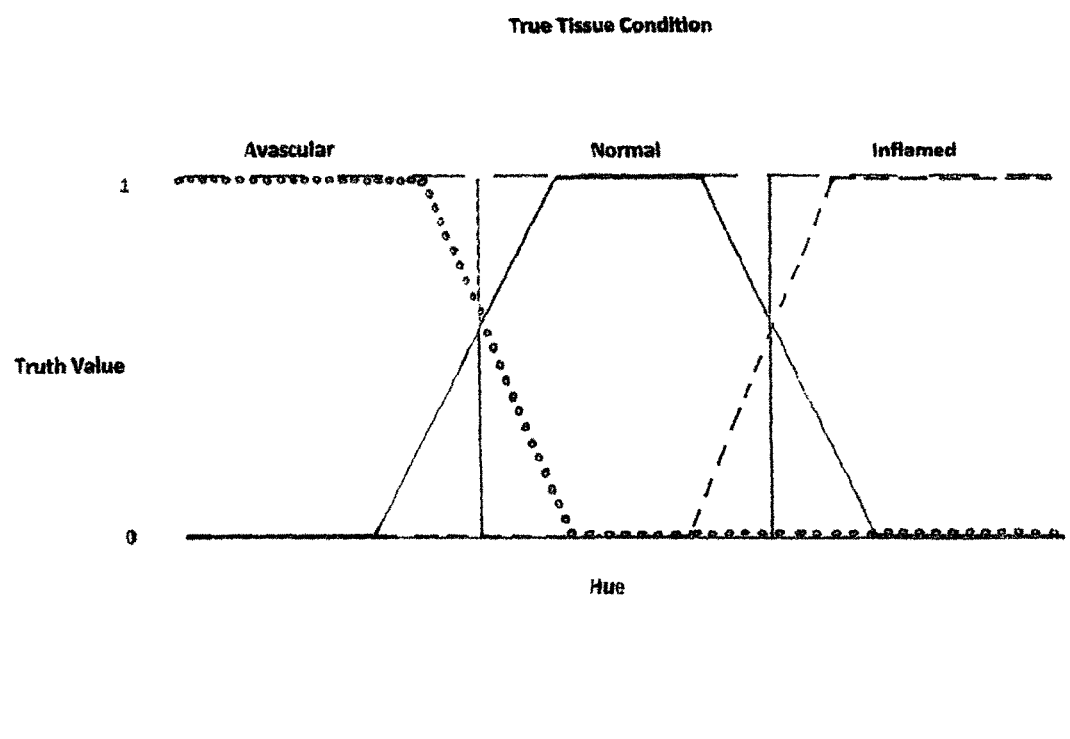
FIG. 13: Illustrates a fuzzy logic graph depicting a hypothetical surface scan done by a physician interested in whether the tissue surface is avascular, normal, or inflamed. The line comprised of circles depicts the degree of membership that is created by the analysis module and includes in the set of "avascular" hues or tissue; the continuous line comprises the degree of membership for those hues that the analysis module operates to include in the set of "normal" hues or tissue; and the dashed line comprises the degree of membership that the analysis module operates to include in the set of "inflamed" hues or tissue.

As above, the analysis module 600 can operate to link raw HSV data to an assignment in one or several models, both arithmetic, differential, and/or geometric, and from that point then derive a TSC 700 from these models, using the formulae, calculus, registry, and/or geometric manipulations as above. But how certain can the operator O be about the actual validity of his derived TSC? For this, the analysis module 600 can utilize any of a variety of mathematical manipulations, such as Boolean, traditional, and fuzzy logic theorems to assign a probability that the derived TSC is indeed indicative of the true nature of the surface. As an elementary example, we can imagine that the physician, scanning a patch of tissue, is interested in three surface states of the tissue: avascular (little or no blood flow), normal, or inflamed (generally extra blood flow). Avascular tissue tends toward achromatic white, with little or no chromatic red saturation, but it could nevertheless be somewhat bright, or high valued. Thus, this tissue state would occupy points in the upper right corner of the RGB color representation (cube) 308 of FIG. 4, near the central or neutral axis. The normal tissue would have some red saturation and would be less bright, so it would tend towards the color points nearer the red vertex in the foreground of the RGB color representation (cube) 308 of FIG. 4. The inflamed tissue, if acutely inflamed, would have a high saturation of red and more brightness than the normal tissue, so it might occupy points in yet a different region of the RGB color representation (cube) 308. One can now easily imagine that there would be points of overlap between these three regions of the RGB color representation (cube) 308. (Again, one skilled in the art can now easily assign these three sets of points into any of the other color spaces or formulae as detailed above, but for the sake of simplicity, we are using the RGB-HSV cube). In one preferred embodiment, fuzzy logic is used to assign points in each of the three sets of points to a fuzzy graph (FIG. 13) in which membership of each point into one of the three tissue states can be derived. Some points are clearly members of only one of the three tissue states, so for these points the physician can have a high certainty that this part of the color space, with its contained points, has membership only in one state. Thus, the actual tissue upon which these fuzzy points map into must clearly lie within this state. Fuzzy logic allows that the points of overlap between the three groups of points may have membership to a certain degree in more than one tissue state. Thus, for these points, the physician realizes that this overlapping coordinate space or color space and its subsequent fuzzification are telling him that this region of the actual surface is grading from, say, normal to inflamed, and thus is at risk of clinical deterioration. If the physician had scanned the same tissue surface previously, then he/she could create the comparisons, using either the formulae or the geometric entities comprised above, to determine the change in the tissue state over the time interval. Registry, applied across any of the comprised geometries, would then identify regions of separation and/or overlap in the constructed coordinate space or color spaces; again, these points of separation or overlap can then be subjected to logic, as above, to provide the probability that a particular part of the actual surface actually corresponds to the tissue state that the physician is concerned about. Thus, the coordinate spaces or color spaces comprised herein comprise a set of eigenpoints, or an eigensurface or an eigenspace lying virtually above the actual surface, and mapping into the actual surface. A single eigenpoint can thus map into one or many actual surface points. Likewise, one surface point can map into one or into many eigenpoints. This virtual, or eigenpoint, is very important as one skilled in the art can now clearly see that the mathematical formulae, the created coordinate spaces or color spaces, the registry and other geometric manipulations, and the logical operations thereon are all actually operations done in, through, and over the eigenpoints, rather than the points in the actual physical surface. Hence, the true meaning and analysis of the actual surface can only be derived with certainty via operations done through the eigenpoints, as these eigenpoints map into the actual surface. The eigenpoints carry the "truth" of the actual surface. Obviously, any parameter of the actual surface, such as contour, temperature, gloss, electrical or magnetic field strength or field vectors, dynamic rebound, and so on, as well as color, can be subject to all of the foregoing manipulations and operations, and thus these parameters can comprise their own eigenpoints. Indeed, the analysis module 600 in a preferred embodiment operates to create formulae and geometries derived from the logical operations over the eigenpoints, such that one can now easily imagine the fuzzy graph of FIG. 13, a space unto itself, being registered into one or more of the color or other parameter spaces, and thus adding more eigenpoints (these points corresponding to a logic analysis of one of the other eigenpoints), to the overlying virtual set of points. Likewise, these logic eigenpoints can map one-to-many or many-to-one into the actual surface points or into one of the coordinate spaces or color spaces or into one of the other eigenpoints.

It should be understood that in describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

The invention claimed is:

1. A method of determining the condition of a surface of an object comprises the steps of:
   scanning the surface of an object and detecting and measuring the electromagnetic spectrum being directed from or through or within the body to obtain raw data from a plurality of points along the surface and assigning color values for each particular data type of raw data;
   creating a coordinate system wherein each coordinate axis represents a particular data type;
   plotting the assigned color values of the raw data on the coordinate system for each plurality of points to create a color representation; and
   using the color representation to create a first color space; and
   displaying the first color space for viewing by an operator to determine the condition of the surface.

2. The method of claim 1 further comprising the step of displaying a second color space for the surface of the object and determine differences between the first color space and the second color space.

3. The method of claim 1 further comprising the steps of:
   the operator selecting a particular point on the first color space having certain color values for each particular data type; and
   displaying an image of the surface showing particular points on the image of the surface having the same color values for each particular data type.

4. The method of claim 1 wherein the raw data includes measurements of color.

5. The method of claim 1 wherein the raw data includes measurements of color and gloss.

6. A method of determining the condition of a surface comprises the steps of:
   scanning the surface of an object and detecting and measuring electromagnetic spectrum being directed away the surface to obtain raw data from a plurality of points along the surface and assigning color values for each particular data type of raw data;
   creating a coordinate system having one coordinate axis representing a particular wavelength and one coordinate representing a color value of each wavelength;
   plotting the color values of the raw data for each plurality of points on the coordinate system and create a first color representation;
   selecting color values and using the color values to create a first color space; and
   displaying the first color space for viewing by an operator to determine the condition of the surface.

7. The method of claim 6 wherein the coordinate system is a radial coordinate system.

8. The method of claim 6 further comprising the step of creating a using reference data and color values and to create a second color space for the surface of the object and determine differences between the first color space and the second color space.

9. The method of claim 6 further comprising the steps of:
   the operator selecting a particular point on the first color space having certain color values for each particular data type; and
   displaying an image of the surface showing particular points on the image of the surface having the same color values for each particular data type.

10. The method of claim 6 wherein the raw data includes measurements of color.

11. The method of claim 6 wherein the raw data includes measurements of color and gloss.

12. A system of determining the condition of a surface comprising:
    sensors that operate to scan the surface of an object and detecting and measuring electromagnetic spectrum being directed away from the surface and to obtain raw data from a plurality of points along the surface;
    an analysis module that received raw data from said sensors and operates to assign color values for each particular data type of raw data;
    wherein said analysis module further operates to create a coordinate system having one coordinate axis representing a particular wavelength and one coordinate representing a color value of each wavelength;

wherein said analysis module further operates to plot the color values of said raw data for each said plurality of points on said coordinate system to create a first color representation; and wherein said analysis module further operates to create a first color space wherein said color space wherein each point in the color space having the same color value and using a display device that receives data from said analysis module and operates to display said first color space for viewing by an operator to determine the condition of the surface.

13. The system of claim 12 wherein said coordinate system is a radial coordinate system.

14. The system of claim 12 wherein said analysis module further operates to display a second color space for the surface of the object and operates to determine differences between said first color space and said second color space.

15. The system of claim 12 wherein said analysis module further operates to receive information from the operator of a selected particular point on said first color space having certain color values for each particular data type; and wherein said display device operates to display an image of the surface showing particular points on said image of the surface having the same color values for each particular data type.

16. The system of claim 12 wherein said raw data includes measurements of color.

17. The system of claim 12 wherein said raw data includes measurements of color and gloss.

\* \* \* \* \*